United States Patent
Rodriguez

(10) Patent No.: US 9,623,806 B2
(45) Date of Patent: Apr. 18, 2017

(54) DEVICE AND METHOD FOR RESTRAINING CONTAINERS IN A VEHICLE

(71) Applicant: Jesus Alejandro Rodriguez, Hanover, MD (US)

(72) Inventor: Jesus Alejandro Rodriguez, Hanover, MD (US)

( * ) Notice: Subject to any disclaimer, the term of this patent is extended or adjusted under 35 U.S.C. 154(b) by 152 days.

(21) Appl. No.: 14/792,957

(22) Filed: Jul. 7, 2015

(65) Prior Publication Data

US 2017/0008460 A1 Jan. 12, 2017

(51) Int. Cl.
*B60R 7/04* (2006.01)
*B60R 11/00* (2006.01)
*B60N 2/44* (2006.01)

(52) U.S. Cl.
CPC ...... *B60R 7/043* (2013.01); *B60N 2002/4405* (2013.01); *B60R 2011/0017* (2013.01); *B60R 2011/0059* (2013.01); *B60R 2011/0071* (2013.01); *Y10S 224/925* (2013.01)

(58) Field of Classification Search
CPC ............ B60R 7/043; B60R 2011/0017; B60N 2002/4405; Y10S 224/925
USPC .......................... 224/275, 162, 925; D30/153
See application file for complete search history.

(56) References Cited

U.S. PATENT DOCUMENTS

| | | | | |
|---|---|---|---|---|
| 3,198,175 A | * | 8/1965 | Dean | A01K 27/004 119/796 |
| 3,547,326 A | * | 12/1970 | Trammell, Jr. | B60N 3/08 224/275 |
| 4,630,324 A | * | 12/1986 | Fligsten | B60R 22/00 280/749 |
| 4,943,111 A | | 7/1990 | VanderLaan | |
| 5,383,727 A | * | 1/1995 | Rife | A45C 11/00 150/900 |
| 5,443,191 A | * | 8/1995 | Jorgenson | B60R 7/14 211/64 |
| 5,540,468 A | * | 7/1996 | Fassman | E05B 1/0053 224/162 |

(Continued)

FOREIGN PATENT DOCUMENTS

| | | | | |
|---|---|---|---|---|
| CA | 2531222 A | * | 4/2016 | ............. B60R 7/043 |
| GB | 2404905 A | * | 2/2005 | ............. B60R 7/043 |

(Continued)

*Primary Examiner* — Justin Larson
(74) *Attorney, Agent, or Firm* — Vincent G. LoTempio; Kloss, Stenger & LoTemio; David T. Stephenson

(57) ABSTRACT

A device and method to restrain a container against a vehicle seat with minimal conspicuousness of the container and obstruction by the container. The device is comprised of a vehicle fastener, strap, recoiling wheel, cable, and container fastener. The method uses the combinative effect of spring, frictional, and gravitational forces to limit the horizontal, vertical, and diagonal movement of the container during normal vehicle operations such as accelerating, decelerating, and turning. The device and method involve placing a container on the vehicle floor near the front edge of a seat, connecting a hook to a headrest pole, attaching an optional stabilizer to the front edge of the seat, extending a cable from the recoiling wheel, connecting a hook to the container handles, and releasing the device and container. The method provides stable and safe retention of a container and allows for the container to be partially hidden from view.

16 Claims, 11 Drawing Sheets

(56) References Cited

U.S. PATENT DOCUMENTS

| | | | | |
|---|---|---|---|---|
| 5,752,719 A * | 5/1998 | Mitschelen | B60R 7/043 224/275 |
| D400,785 S * | 11/1998 | Randall | D9/434 |
| 5,833,102 A * | 11/1998 | Jacobson | B60R 7/14 211/64 |
| 5,967,602 A * | 10/1999 | Ptak | B60R 7/043 224/275 |
| 6,651,941 B1 * | 11/2003 | Kinsel | A45F 5/1026 248/100 |
| 6,666,506 B2 | 12/2003 | Burns et al. | |
| 6,863,249 B1 * | 3/2005 | Alvord | B60R 9/02 248/208 |
| 6,923,356 B2 * | 8/2005 | Reynolds | A45F 3/14 224/254 |
| 7,036,189 B2 * | 5/2006 | Steigerwald | B60P 7/0823 24/265 H |
| 7,343,647 B1 * | 3/2008 | Kinskey | A45F 5/00 16/406 |
| 7,766,422 B2 * | 8/2010 | Edwards | B60R 7/043 297/188.01 |
| D658,113 S * | 4/2012 | Henderson | D12/416 |
| D676,618 S * | 2/2013 | Kalbach | D30/152 |
| 8,875,965 B2 * | 11/2014 | Corets | A47G 29/083 224/666 |
| 8,944,302 B2 * | 2/2015 | Nolan | B60R 7/043 224/275 |
| 9,102,276 B1 * | 8/2015 | Virgin | B60R 7/043 |
| 9,199,580 B2 * | 12/2015 | Lehtonen | B60R 7/043 |
| 9,463,752 B1 * | 10/2016 | Lehtonen | B60R 7/08 |
| 9,539,949 B2 * | 1/2017 | Nuako | B60R 7/043 |
| 2004/0200940 A1 * | 10/2004 | Pacheco | A47C 7/62 248/301 |
| 2005/0258203 A1 * | 11/2005 | Weaver | A45F 5/021 224/162 |
| 2006/0188354 A1 * | 8/2006 | Bosley | B60P 3/079 410/23 |
| 2007/0108241 A1 * | 5/2007 | Bass | A45F 5/00 224/162 |
| 2008/0035687 A1 * | 2/2008 | Beaulieu | B60R 7/043 224/275 |
| 2008/0067205 A1 * | 3/2008 | Semendoff | B60R 7/043 224/275 |
| 2010/0230571 A1 | 9/2010 | Sharkey et al. | |
| 2011/0049203 A1 * | 3/2011 | Stark | A45C 13/38 224/255 |
| 2011/0248057 A1 * | 10/2011 | Schmitz | A45C 3/04 224/275 |
| 2013/0105533 A1 * | 5/2013 | Orduno | B60R 7/043 224/275 |
| 2013/0229045 A1 * | 9/2013 | Agustin | B60R 7/043 297/463.1 |
| 2015/0021369 A1 * | 1/2015 | Lehtonen | B60R 7/043 224/275 |
| 2015/0298619 A1 * | 10/2015 | Parisi | B60R 11/00 224/275 |
| 2016/0257258 A1 * | 9/2016 | Conlon | B60R 7/043 |
| 2016/0332580 A1 * | 11/2016 | Nouri | B60R 7/005 |
| 2017/0008460 A1 * | 1/2017 | Rodriguez | B60R 7/043 |

FOREIGN PATENT DOCUMENTS

| | | | | |
|---|---|---|---|---|
| GB | 2439323 A | * | 12/2007 | B60R 7/043 |
| JP | 11099884 A | * | 4/1999 | |
| JP | 11129819 A | * | 5/1999 | |
| JP | 2000255327 A | * | 9/2000 | |
| JP | 2001347891 A | * | 12/2001 | |
| JP | 2002036959 A | * | 2/2002 | |
| JP | 2002067811 A | * | 3/2002 | |
| JP | 2003335177 A | * | 11/2003 | |

\* cited by examiner

DEVICE AND METHOD FOR RESTRAINING CONTAINERS IN A VEHICLE

FIELD OF THE INVENTION

The present invention relates generally to a device and method for restraining containers in a vehicle. More so, a device restrains a container against a vehicle seat through the use of the combinative effect of spring, frictional, and gravitational forces, while minimizing conspicuousness of the container and obstruction by the container.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known that personal containers, such as grocery bags, purses, briefcases, backpacks, and shopping bags are used to carry items. Such containers often include a handle or shoulder strap and have a top opening to access an interior compartment of the container. However, some personal containers lack closures that completely seal its opening. Even with bags having closures, an individual may neglect to use the closure properly. Thus, there is a risk that the contents of the container can spill out if knocked over.

Typically, people transport containers and the contents therein by vehicles. For example, a driver picks up groceries, places the groceries in a grocery bag, and sets the grocery bag on the front passenger seat or on the floor in front of the seat. The grocery bag can often contain liquids and/or fragile items susceptible to spillage, breakage, or bruising. While operating the vehicle, even in a gentle turn, items on the front seat often slide out of place and fall on the floor. It is known that vehicle seats in general are not well suited to hold items being transported. Even if secured, some items such as containers of liquids can still be difficult to transport on the seat of a vehicle.

In many instances, the placement of a container, such as a purse or handbag on a vehicle seat often presents problems for the user. The container is susceptible to tipping over or even sliding off the seat during braking and turning maneuvers due to the inertia of the container inside a moving vehicle. Placement of a container on the floor of the vehicle often results in the bag being out of reach of the driver and still subject to tipping. Placement of a container on a console between the seats of a vehicle having individual front seats may prevent the use of the console as an armrest, interfere with vehicle controls on the console, and subject the container to tipping over or sliding off the console during braking or acceleration of the vehicle. The movement of a container frequently causes a distraction to the driver, thereby creating a safety concern. Often drivers attempt to grab or catch a container and/or contents while braking or turning, which may cause the driver to lose control of the vehicle.

Proposed solutions to this problem have included attaching one or more hooks to sections of the vehicle for hanging the container. However, large, heavy and bulky items may be difficult to place on or remove from the hook(s). Furthermore, the container is allowed to suspend and swing freely on the hook(s) without any lateral stabilization, which may lead to possible spillage, breakage, bruising, or displacement or the container and/or contents. Furthermore, hanging containers on hooks near the headrest increases the visibility of the container, thereby making it less discrete.

Another proposed solution involves integrating a fastener to a shock absorption system that is coupled to a handle and strap. The strap is adjustable to fit around the vehicle seat. Containers are secured to multiple fasteners, and an individual may transport the containers by either the handle or over-the-shoulder strap. The use of straps to control the container is not a satisfactory solution because it involves various cumbersome and inconvenient steps to secure the container and the straps to a vehicle seat. An individual must secure each bag to individual fasteners, adjust the strap to fit the shoulder, transport the apparatus to a vehicle, and adjust the strap to fit the automobile seat. Because this apparatus was also meant to serve as a carrying aid for multiple bags with handles, these steps must be repeated every time the apparatus is used. Furthermore, this apparatus requires that the containers be placed on the vehicle seat, which increases the visibility of the container.

Other proposals have involved integrating devices into the vehicle that clip to the headrest of the passenger's seat such that the container is suspended from or behind the passenger's seat and/or strapped to the passenger's seat. The problem with these devices is that they keep the container out of easy reach of the driver and limit access to the container. Furthermore, handing a container over or at the backside of a vehicle seat or placing a container on the vehicle seat increases the visibility of the container.

Thus it is readily apparent that there is a long felt need to address the aforementioned deficiencies and inadequacies. Even though the above cited methods for a device and method for restraining a container in a vehicle seat to inhibit excessive movement by the container meets some of the needs of the market, a device and method for restraining a container against a vehicle seat through the use of spring, frictional, and gravitational forces, while maintaining minimal conspicuousness of the container and obstruction by the container, is still desired.

SUMMARY OF THE INVENTION

The present invention is directed to a device and method for restraining a container in a vehicle through the use of the combinative effect of spring, frictional, and gravitational forces, and specifically restraining the container against a vehicle seat during vehicle operation, while minimizing conspicuousness of the container and obstruction by the container. The device generates spring force that pulls the container against a front edge of the vehicle seat, while the weight of the container and contents pulls in an opposite direction. Friction is created between the surfaces of the container and front edge of the vehicle seat when the container is pressed against the front edge. Friction is also created between the surfaces of the container bottom and the vehicle floor when the container is placed on the vehicle floor. The combinative effect of spring, frictional, and gravitational forces limit the front-and-back, side-to-side, and up-and-down movement of the container during vehicle operation, thereby keeping the container upright and restrained.

The recoiling wheel of the device contains a torsion spring that has been twisted and continues to be twisted when the cable is pulled and unwound from the spool inside the recoiling wheel. As the torsion spring is twisted in one direction by an applied force such as a hand pulling the cable from the recoiling wheel, potential energy that is biased to pull the cable in the opposite direction is stored by the torsion spring. When the cable is released, the torsion spring is allowed to pull (retract) and wind the cable back around the spool in order for the torsion spring to restore its original shape.

For the purposes of this invention, spring force is the potential energy that is stored by the torsion spring when the cable is extended from the recoiling wheel. The spring force is exerted on the cable and any object that is attached to the cable. Friction or frictional force is that restrictive force exerted by a surface as an object moves across it or makes an effort to move across it. Friction results from two surfaces being pressed together closely, causing intermolecular attractive forces between molecules of different surfaces. Gravity or gravitational force is the force of attraction between two separate bodies. Gravitational force causes objects to fall to the ground and is countered by the force of a surface acting upon an object such as the vehicle floor supporting a container.

A cable biased to retract the container against the front edge of the seat may also help to close an opening in the container, such as an open end of a bag. Not only does the spring force help to close the opening of the container, but the container fastener can also bring the handles of a bag (especially plastic grocery bags or other bags with more than one handle) together. While being restrained by the device against the front edge of the vehicle seat and vehicle floor, the container is at least partially hidden from view. The container is detachably connected to the device with minimal effort and time. The device can be transferred between various seats and used in a variety of applications, for example, in more than one type of automobile or in various forms of transportation with vehicle-like seats. When not in use, the device stows behind the vehicle seat, out of view of the driver.

In some embodiments, the device may attach to an upper section of a vehicle seat through a vehicle fastener, such as a hook or carabiner that grasps on an adjustable headrest pole on the vehicle seat. Though, in some embodiments, the vehicle fastener could be replaced with a clasp, loop, ring, magnet or other fastening means to form a secure connection with the headrest, headrest poles, other area of the upper section of the vehicle seat, or other area of the vehicle. An adjustable flexible strap connects to the vehicle fastener. The strap is defined by a strap upper end that joins with the vehicle fastener, and a strap lower end that joins with additional components leading to the container. The strap could be adjustable to allow for making the total length of the device (fasteners, wheel, strap, and cable) longer or shorter. The extensible cable and strap can be adjusted to accommodate various lengths required.

In some embodiments, the strap lower end may attach to a recoiling wheel. The recoiling wheel utilizes a spring action that is biased to pull the cable and the attached container upwards in a first direction, towards the recoiling wheel, causing the container to press against the front edge of the seat. The spring force created by the recoiling wheel forms a biased force on the cable that pulls against the weight of the container. The weight of the container pulls in a second direction, toward the vehicle seat, opposing the spring force. As a result, a variable tension is created on the cable. When the spring and gravitational forces are balanced, a state of equilibrium is reached in which there is no relative movement between the container and vehicle seat and between the container and vehicle floor.

A cable extends from the recoiling wheel and progresses down to the container. The cable may also be stretchable like the flexible strap. However, in some embodiments, the cable does not stretch significantly, and serves chiefly as a connector between the recoiling wheel and the container. The cable is configured to wind in and out of the recoiling wheel from a cable wheel end. In this manner, the cable can extend and retract easily from the recoiling wheel.

An opposing cable container end attaches to a container fastener, such as a hook or carabiner. In some embodiments, the container fastener could be replaced with a clasp, loop, ring, magnet or other fastening means to form a secure connection with the container. The container fastener is configured to grasp, clip, pierce, or wrap around the container, and specifically handles, apertures, loops, or rings on the container. In one embodiment, the spring force exerted on the cable and the attached container fastener by the recoiling wheel causes the container fastener to cinch the handles of the container together to close an opening in the container. It should be understood by those of ordinary skill in the art that the total length of the device can be adjusted through the adjustments to the length of the strap using buttons, buckles or slides; the use of various fasteners of different lengths; or the use of additional connectors that extend the length of the strap and/or cable. In this manner, the device can be used on a variety of vehicle seat types and sizes.

In some embodiments, the device may include a stabilizer to help stabilize the container against the front edge of the seat. The stabilizer may include a substantially rectangular block disposed to fasten securely to the front edge of the vehicle seat. It should be readily obvious to those of ordinary skill in the art that the stabilizer could be made in various shapes (e.g. oval, triangular) or be constructed from multiple pieces (i.e., two pieces) instead of one block. The stabilizer comprises a stabilizer seat end and a stabilizer container end. The stabilizer seat end can be attached to the front edge of the vehicle seat. The container can butt up against the stabilizer container end, which in essence, serves as a supportive barrier for the container. The stabilizer may also include a stabilizer depression through which the handle may slide to align the container with the front edge of the vehicle seat. A stabilizer can be constructed to accommodate a few handles as they are pulled and/or bent across the edge of the seat toward the recoiling wheel or the upper portions of the bag that are pulled and/or bent across the edge of the seat toward the recoiling wheel. The stabilizer may be used when the container (handle) extends lower than the edge of the seat. In this situation, there is not enough friction on the handles against the edge of the seat. Therefore, the friction that is placed on the cable can be augmented with the support that the stabilizer provides to prevent movement from side to side. In some embodiments, the stabilizer may be constructed of high-friction material. In other embodiments, the depression may be lined or coated with high-friction material such as rubber to increase the friction between the container (handle) and the stabilizer container end surfaces.

A first aspect of the present invention provides a device for restraining a container in a vehicle through the use of the combinative effect of spring, frictional, and gravitational forces, comprising:
   a vehicle fastener configured to anchor the device;
   a strap comprising a strap upper end and a strap lower end, the strap upper end disposed to join with the vehicle fastener, the strap configured to stretch laterally, vertically, and diagonally;

a recoiling wheel comprising a wheel strap end and a wheel cable end, the wheel strap end disposed to join with the strap lower end, the recoiling wheel configured to create a biased spring force in a first direction;

a cable comprising a cable wheel end and a cable container end, the cable wheel end disposed to join with the wheel cable end, wherein the recoiling wheel biases the cable to retract in a first direction;

a container fastener disposed to join with the cable container end, the container fastener configured to form a point of attachment; and a stabilizer configured to provide a surface for support and alignment.

In a second aspect of the present invention, the device is disposed to position on a vehicle seat.

In another aspect, the vehicle fastener is a hook, carabiner, clasp, loop, ring, clamp or magnet.

In another aspect, the vehicle fastener attaches to an adjustable headrest pole, other area of the upper section of the vehicle seat, or other area of the vehicle proximal to the upper section of the vehicle seat.

In another aspect, the strap has a flexible composition.

In another aspect, the strap is length adjustable.

In another aspect, the recoiling wheel comprises a torsion spring.

In another aspect, the recoiling wheel biases the cable upwardly, towards the recoiling wheel.

In another aspect, the cable winds around a spool inside the recoiling wheel.

In yet another aspect, the cable comprises a synthetic composition or a metal chain.

In yet another aspect, the container fastener is a hook, carabiner, clasp, loop, ring, clamp or magnet.

In yet another aspect, the container fastener forms a point of attachment with a container.

In yet another aspect, the weight of the container and contents exerts a force in a second direction.

In yet another aspect, the first direction presses the container against a front edge of a vehicle seat.

In yet another aspect, the stabilizer is a substantially rectangular block.

In yet another aspect, the stabilizer positions on the front edge of the vehicle seat.

In yet another aspect, the stabilizer engages one or more handles of the container.

In yet another aspect, the stabilizer comprises a stabilizer seat end and a stabilizer container end, the stabilizer seat end configured to attach to the front edge of a vehicle seat and the container end configured to support the container.

In yet another aspect, the stabilizer comprises a stabilizer depression configured to receive one or more handles from the container, wherein the stabilizer depression aligns the container with the front edge of the seat.

In yet another aspect, the stabilizer comprises a stabilizer depression configured to receive one or more handles from the container, wherein the stabilizer depression restricts the side-to-side movement of the container.

In yet another aspect, the container rests on a vehicle floor while being supported by the device.

It is one objective of the present invention to securely restrain a container and the contents therein against a vehicle seat, especially during operation of the vehicle.

It is another objective of the present invention to restrict lateral, vertical, and diagonal movement of the container to prevent spillages, breakage, and bruising.

Yet another objective of the present invention is to support the container upright on the vehicle floor, while simultaneously pressing the container against the front edge of the vehicle seat and against a vehicle floor.

Yet another objective of the present invention is to close an opening in the container by pulling the handles on the container in the first direction, and thereby cinching the container closed.

Yet another objective of the present invention is to provide a portable and easy-to-operate device that restrains containers in a variety of vehicles.

Yet another objective of the present invention is to provide length-adjustable device to adapt to variously sized containers and vehicle seats.

Yet another objective of the present invention is to enable the device to be used in different vehicles and types of vehicle seats.

Yet another objective of the present invention is to provide a discreet, inexpensive and easy-to-operate device for restraining containers in a vehicle.

Yet another objective of the present invention is to allow for quick and easy storage of the device without cumbersome steps.

Yet another objective of the present invention is to allow easy access to the container and/or contents therein.

The present disclosure also provides a method for restraining a container in a vehicle, against a vehicle seat.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The present invention and the manner in which it may be practiced is further illustrated with reference to the accompanying drawings wherein:

FIG. 1A is a perspective view, FIG. 1B is a perspective front view, and FIG. 1C is a perspective right side view, in accordance with an embodiment of the present invention;

FIG. 2A is a perspective front view, and FIG. 2B is a perspective rear view, in accordance with an embodiment of the present invention;

FIG. 4A is a front view, FIG. 4B is a perspective front view, and FIG. 4C is a top view, and FIG. 4D is a perspective rear view, in accordance with an embodiment of the present invention;

FIG. 7A is an illustration of the device of the present invention holding an exemplary handbag, FIG. 7B is an illustration of the device of the present invention holding an exemplary shopping bag, FIG. 7C is an illustration of the device of the present invention holding an exemplary briefcase, 7D is an illustration of the device of the present invention holding an exemplary backpack, 7E is an illustration of the device of the present invention holding exemplary camera bag, and FIG. 7F is an illustration of the device of the present invention holding an exemplary basket;

DETAILED DESCRIPTION OF THE INVENTION

Figure 1A:
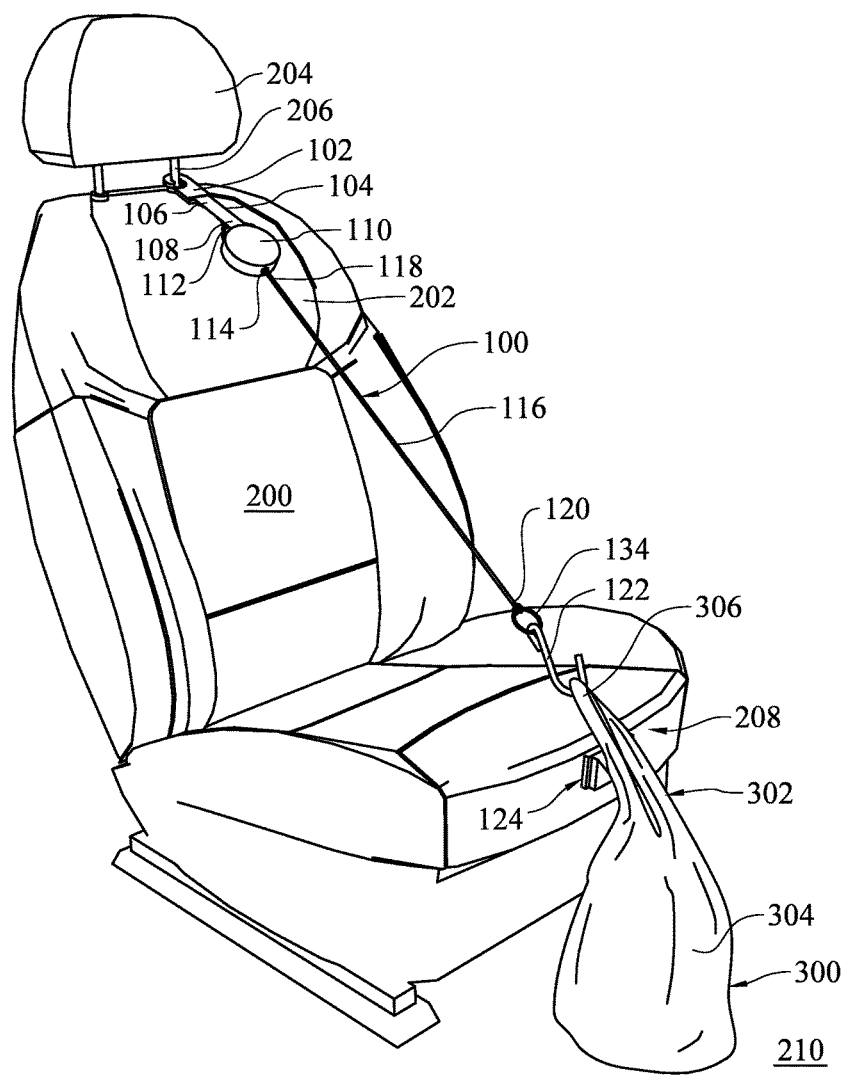
FIGS. 1A, 1B, and 1C are perspective views of an exemplary device restraining an exemplary container against an exemplary vehicle seat, where

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1A. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

In one embodiment of the present invention, presented in FIGS. 1A through 7F, a device 100 restrains a container 300 against a vehicle seat 200 through the use of the combinative effect of spring, frictional, and gravitational forces, while also minimizing visibility and obstruction by the container 300. In one embodiment, the device 100 restrains the container 300 against the vehicle seat 200 during vehicle operation, preventing excessive movement of the container 300. The device 100 supports the container 300 from an adjustable headrest pole 206 on the vehicle seat 200, while simultaneously pressing the container 300 against a front edge 208 of the vehicle seat 200 and against a vehicle floor 210. The device 100 pulls the container 300 in a first direction (towards the recoiling wheel 110), as the container's 300 weight pulls in a substantially opposite second direction (towards the vehicle floor 210); thereby creating a state of equilibrium that helps stabilize the container 300.

Furthermore, the device 100 creates frictional forces on the container 300. Frictional forces are created when the spring force causes the surface of the container 300 press against the surface of the front edge 208 of the vehicle seat 200. Frictional forces are also created when a container 300 is placed on the vehicle floor 210, causing the surface of the container 300 to press against the surface of the vehicle floor 210. These frictional forces provide additional stability for the container 300. The device 100 also serves to align one or more handles 302 on the container 300, such that the container 300 remains centrally positioned and engaged with the front edge 208 of the vehicle seat 200. Additionally, the spring force applied by the device 100 on the container 300 against the front edge 208 of the vehicle seat 200 works to close an opening in the container 300, such as an open end of a bag.

FIG. 1A is a perspective view of an exemplary device 100 in use to restrain a container 300. As shown in FIG. 1A, the device 100 may be configured to stabilize the container 300 laterally against the front edge 208 of the vehicle seat 200, such that tipping over and spillage is prevented. It is also significant to note that, while being restrained by the device 100, the container 300 is at least partially hidden from public view by the vehicle seat 200. This capacity of the device 100 to restrain the container 300 in a position that is substantially discrete and relatively out of sight from outside a vehicle adds an element of extra security to the device 100. The container 300 may easily be attached and removed from the device 100 with minimal effort and without the use of special tools. The device 100 can be transferred between various vehicle seats 200 and used in a variety of applications, for example, in more than one type of vehicle seat 200, in various forms of transportation, and/or with various containers 300. Although FIG. 1A shows the device 100 and stabilizer 124 restraining an exemplary grocery bag 304 the grocery bag handles 306, a variety of containers 300 with handles 302 may be restrained by the device 100.

Figure 1B:
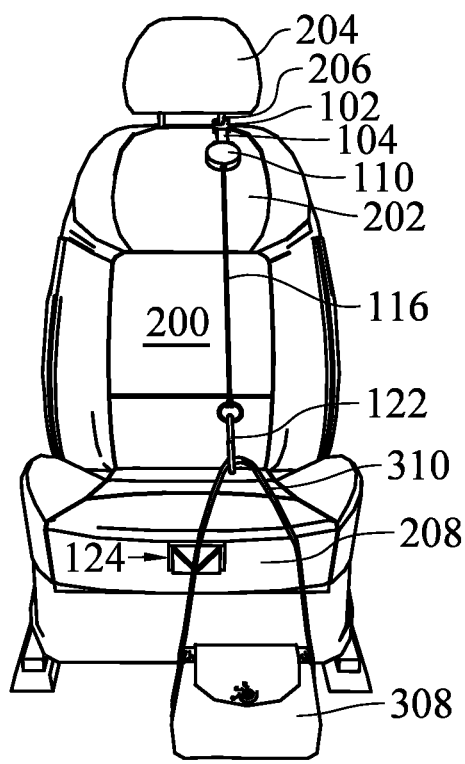
Figure 1C:
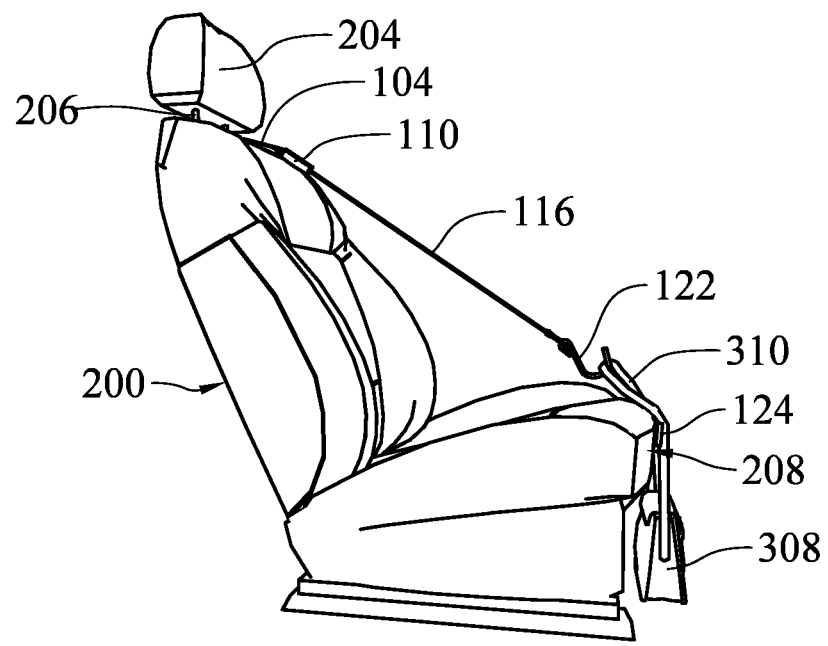

FIGS. 1B and 1C show the device 100 attached to the headrest pole 206 of a vehicle seat 200 on one end and attached to a purse 308, specifically the purse handle 310, on the other end of the device 100. In one embodiment, a vehicle fastener 102 is configured to latch onto the headrest pole 206 of the vehicle seat 200, which may be adjustable to expose more of the headrest pole 206 to the vehicle fastener 102. In other embodiments, the vehicle fastener 102 may attach to a headrest 204 or any other surface on the upper section 202 of the vehicle seat 200. It may be necessary to attach the device 100 to some other surface other than the vehicle seat 200. For example, without limitation, if the vehicle seat 200 does not utilize a headrest 204 or headrest poles 206, the vehicle fastener 102 may attach to the interior roof of the vehicle, or to a seat belt shoulder strap. In any case, the vehicle fastener 102 generally positions above and to the rear the container 300. As shown in FIG. 1C, the device 100 should be above and to the rear of the container 300 so as to bring the handle 302 up and against the front edge 208 of the vehicle seat 200. If the device 100 was attached on the interior roof of the vehicle directly above the container 300, it might not exactly provide the pull across the vehicle seat 200 that is desired to use friction. Furthermore, on the opposite end of the vehicle fastener 102, in proximity of the vehicle floor 210, a stabilizer 124 attaches on a front edge 208 of the vehicle seat 200. The stabilizer 124 works in conjunction with the vehicle fastener 102 to further stabilize and align the container 300 against the vehicle seat 200.

Figure 2A:
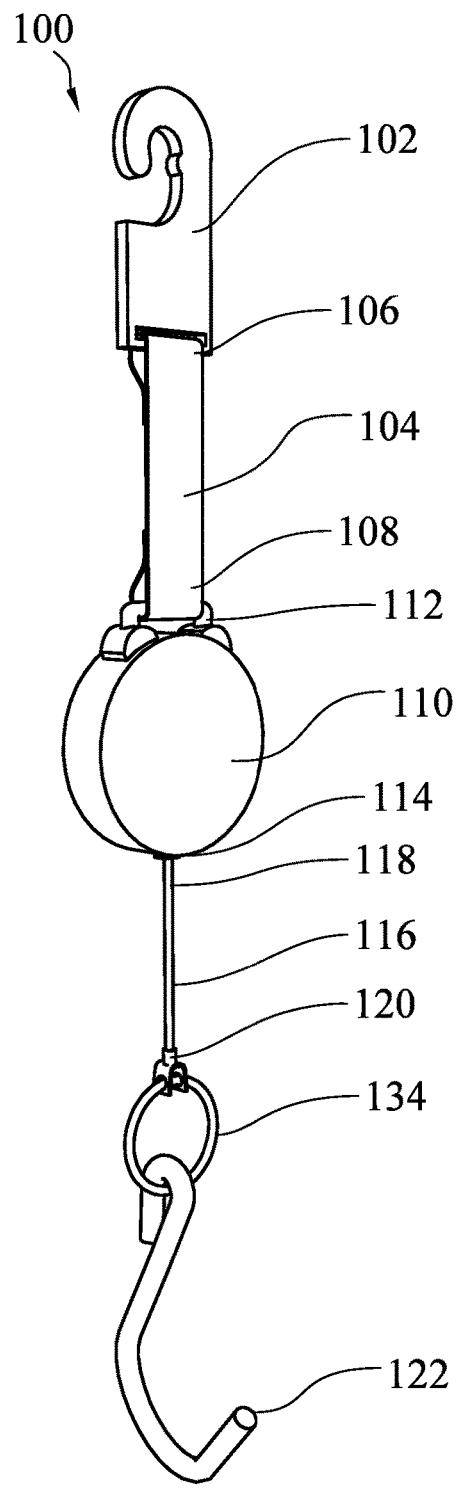
FIGS. 2A and 2B are perspective views of an exemplary vehicle fastener, an exemplary strap, an exemplary recoiling wheel, an exemplary cable, and an exemplary container fastener, where
Figure 2B:
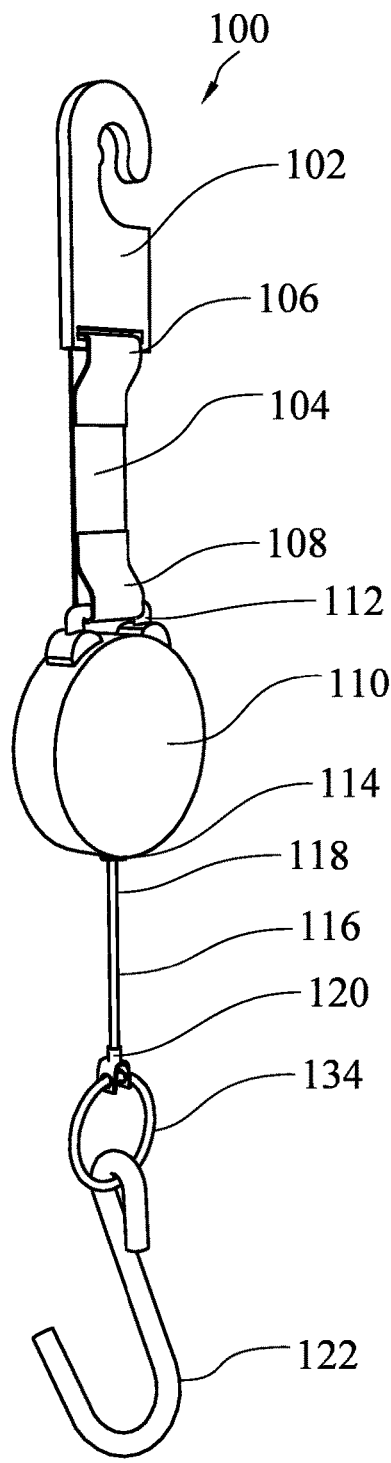

FIGS. 2A and 2B show one embodiment of the device 100 consisting of a vehicle fastener 102, a strap 104, a recoiling wheel 110, a cable 116, and a container fastener 122. FIG. 2A is a perspective front view of one embodiment, and FIG. 2B is a perspective rear view of one embodiment of the device 100. FIGS. 2A and 2B show one embodiment of the vehicle fastener 102 as a J-shaped hook. In other embodiments, the vehicle fastener 102 could be shaped generally as an S-shaped, a C-shaped, or a U-shaped hook, or a closed ring and the like. The vehicle fastener 102 may be fabricated from a metal or a rigid polymer such as rubber or molded plastic for example. In some embodiments, the vehicle fastener 102 may be replaced with a carabiner, clasp, loop, rope, clamp, O-ring, magnet or other fastening mechanism to form a secure connection with the headrest pole 206. FIGS. 2A and 2B show one embodiment of the recoiling wheel 110 as a circular cylinder that contains a flat torsion spring. In other embodiments, the recoiling wheel 110 may be generally shaped as an elliptical cylinder, a cuboid, a prism, or other three-dimensional geometric shape. In other embodiments, the recoiling wheel 110 may contain a coil spring or other flexible elastic object that stores mechanical energy when twisted. In other embodiments, the recoiling wheel 110 may contain a mechanism that generates a pulling force in an opposite direction against the gravitational force of a container 300. FIGS. 2A and 2B show one embodiment of the cable 116 as a flexible cord. In other embodiments, the cable may be a string, rope, twine, wire, or other flexible material used to connect the recoiling wheel 110 and the container fastener 122. FIGS. 2A and 2B show one embodiment of the container fastener 122 as a J-shaped hook. However, the container fastener 122 could have an S-shape, a C-shape, or a U-shaped hook. In some embodiments, the container fastener 122 may be replaced with a carabiner, clasp, loop, rope, clamp, O-ring, magnet or other fastening mechanism to form a secure connection with the container 300.

Figure 3:
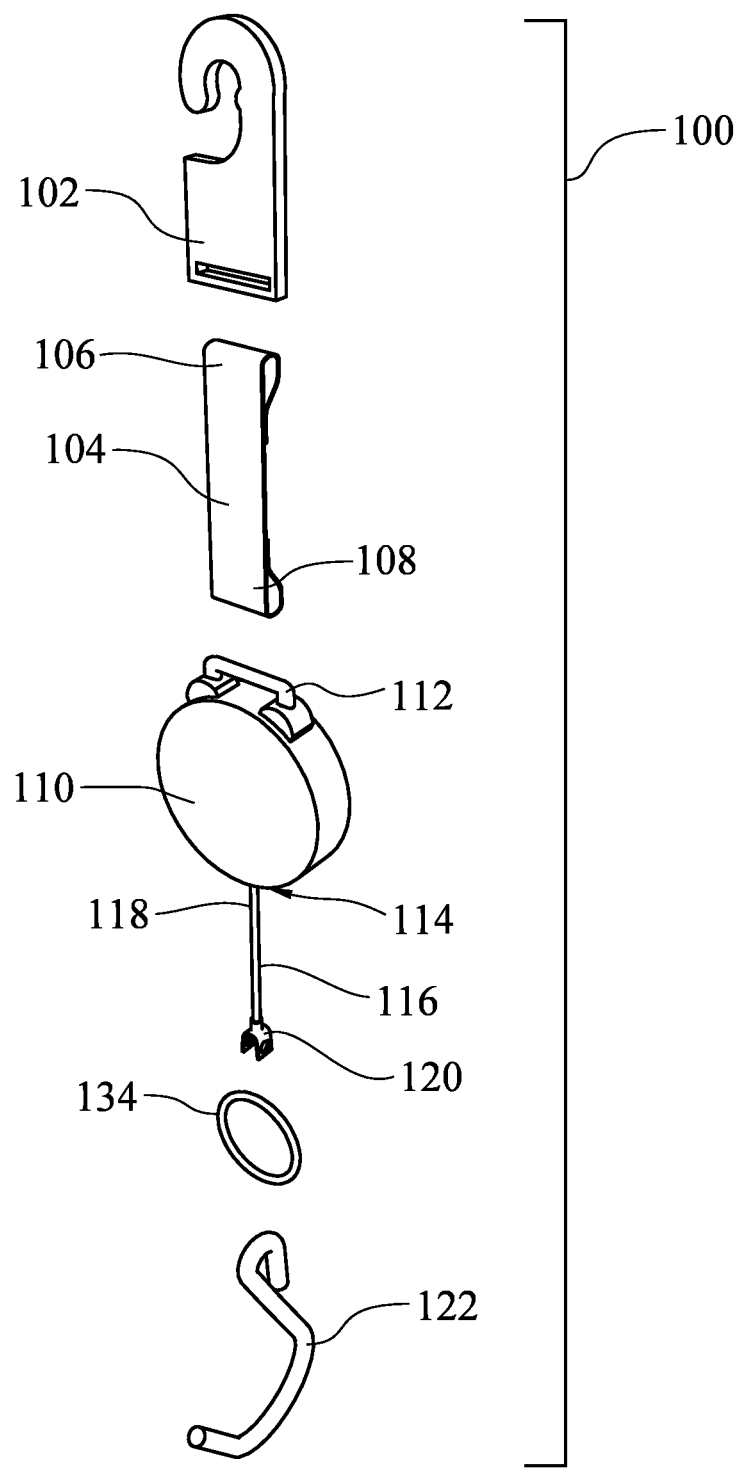
FIG. 3 is a exploded view of an exemplary device with the different components separated to highlight the construction, in accordance with an embodiment of the present invention.

FIG. 3 shows the components of one embodiment of the device 100. An adjustable flexible strap 104 connects to the vehicle fastener 102. The strap 104 is defined by a strap upper end 106 that joins with the vehicle fastener 102, and a strap lower end 108 that joins with additional components leading to the container 300. The flexible characteristics of the strap 104 enable the container 300 to move in various longitudinal, lateral, and diagonal directions. This flexible play is important because, as the vehicle accelerates, decelerates, and turns during operation, the container 300 can adjust positions so as not to damage the container 300 and/or any items contained within. In some embodiments, the strap 104 may be length adjustable through the use of one or more snap buttons, buckles or slides.

In some embodiments, the strap lower end 108 may attach to a recoiling wheel 110. The recoiling wheel 110 is defined by a wheel strap end 112 that joins with the strap lower end 108. The wheel strap end 112 may include a U-shaped bracket configured to receive the strap lower end 108, whereby the free end of the strap lower end 108 loops around the U-shaped bracket and refastens to the strap lower end 108. However, in other embodiments, any connection point that securely fastens the strap lower end 108 to the wheel strap end 112 may be utilized. The wheel strap end 112 may also enable the adjustable flexible strap 104 to adjust in length through the use of buttons, buckles, slides, or other length adjusting mechanism. The recoiling wheel 110 is further defined by a wheel cable end 114 that joins with a cable 116 at a cable wheel end 118. The cable wheel end 118 generally covers a region from inside the recoiling wheel 110 to approximately outside the recoiling wheel 110. The wheel cable end 114 may have a wheel aperture that enables passage of a retractable and extendable cable 116 into the recoiling wheel 110.

The recoiling wheel 110 is configured to create a biased force on the cable 116 in a first direction toward the recoiling wheel 110. In one possible embodiment, the recoiling wheel 110 utilizes a torsion spring that is biased to pull the container 300 in the first direction, upwards towards the recoiling wheel 110 and against the front edge 208 of the vehicle seat 200. The spring force created by the recoiling wheel 110 the container 300, and the weight of the container 300 pulls the container 300 in a second direction toward the vehicle floor 210. Thus, the weight of the container 300 pulls in the opposite, second direction against the spring force generated by the recoiling wheel 110 to create a variable tension on the cable. An equilibrium of sorts is established between the device 100 and the container 300. Additionally, the container 300 remains in contact with the front edge 208 of the vehicle seat 200 and the vehicle floor 210, such that friction serves to at least partially restrain the container 300.

A cable 116 extends from the recoiling wheel 110 and progresses down to the container 300. The cable 116 is defined by a cable wheel end 118 and a cable container end 120. The cable 116 may be stretchable like the flexible strap 104. However, in some embodiments, the cable 116 does not stretch significantly, and serves chiefly as a connecting mechanism between the recoiling wheel 110 and the container 300. For example but not limited to, the cable 116 may be manufactured as a metal chain, metal cord, or other cord made of synthetic fabric such as nylon and the like. The cable 116 is configured to wind in and out of the recoiling wheel 110 from the cable wheel end 118. In this manner, the cable 116 can extend and retract freely from the recoiling wheel 110. In some embodiments, the cable 116 winds around a spool inside the recoiling wheel 110, allowing the length of exposed cable 116 to be adjustable. The adjustment of the strap 104 and/or length of exposed cable 116 will allow the device 100 to suit the situation, such as to compensate for variously sized vehicle seats 200 and containers 300.

The cable container end 120 is configured to attach to a container fastener 122. In one embodiment, a ring 134 may be used to connect the cable container end 120 to the container fastener 122. The container fastener 122 may include, without limitation, a hook, a double hook, a grapple, a carabiner, a clasp, a ring, a loop, a clamp, and a magnet. The container fastener 122 is configured to grasp, clip, pierce, or wrap around the container 300, and specifically a handle 302, apertures, loops, or rings on the container 300. In one embodiment, the spring force from the cable 116 cinches the handles 302 of the container 300 together to close an opening in the container 300. The cable 116 has sufficient length to hold the container 300 against the front edge 208 of the vehicle seat 200. It should be apparent to those skilled in the art that the total length of the device 100 can be adjusted through the adjustment of the strap 104 using snaps, buttons, buckles, or slides and the like. In this manner, the device 100 can be used on a variety of vehicle seats 200. In one embodiment, a separate component that extends the length of the cable 116 may be configured to easily attach to and detach from the cable container end 120 at one distal end and attach to and detach from the container fastener 122.

Figure 4A:
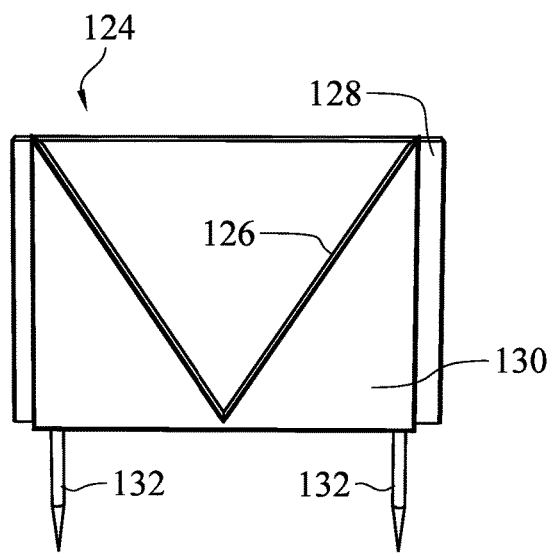
FIGS. 4A, 4B, 4C, and 4D are various views of an exemplary stabilizer, where
Figure 4B:
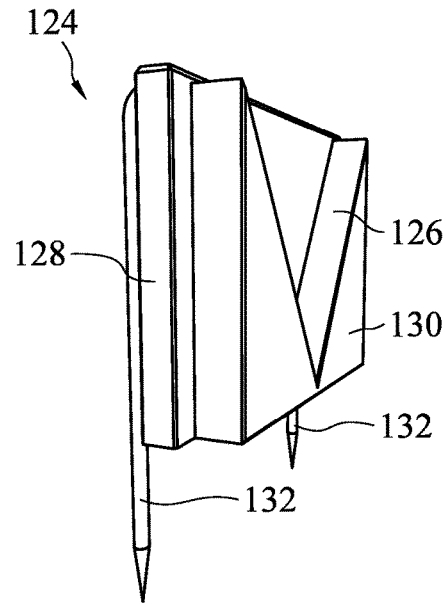
Figure 4C:
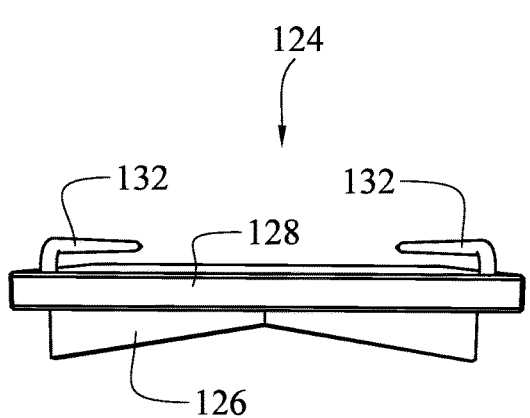
Figure 4D:
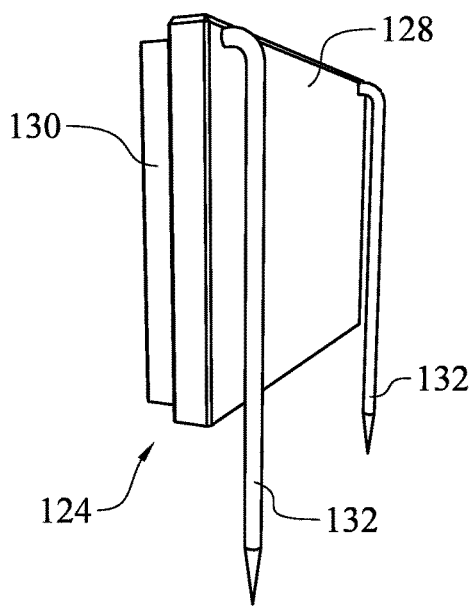

FIGS. 4A, 4B, 4C and 4D are various views of an exemplary stabilizer 124, where FIG. 4A is a front view, FIG. 4B is a perspective front view, FIG. 4C is a top view, and FIG. 4D is a perspective rear view. The device 100 may include and operate in conjunction with a stabilizer 124 to help stabilize and align the container 300 against the front edge 208 of the vehicle seat 200. In one embodiment, the stabilizer 124 may include a substantially rectangular block having a V-shaped or U-shaped groove as a stabilizer depression 126 disposed to fasten securely to the front edge 208 of the vehicle seat 200 through a pair of pins 132. The stabilizer 124 comprises a stabilizer seat end 128 and a stabilizer container end 130. In some embodiments, the stabilizer seat end 128 may be attached to the front edge 208 of a vehicle seat 200 through the use of adhesives, magnets, snaps, and/or other mechanism to securely fasten the stabilizer 124 to the front edge 208. In other embodiments, the stabilizer 124 may be generally shaped as a square, circle, triangle, oval or other geometric shape. In some embodiments, the stabilizer depression 126 may be formed by one continuous protrusion on the stabilizer 124. In other embodiments, the stabilizer depression 126 may be formed by two or more protrusions on the stabilizer 124. For example, two vertically parallel protrusions on the stabilizer container end 130 may form a stabilizer depression 126. In some embodiments, the stabilizer 124 may be comprised of two or more separate components such as two separate blocks with protrusions. For example, two separate blocks with at least one cylindrical protrusion on each block may be fastened to the front edge 208 of the vehicle seat 200 on the same horizontal plane and with sufficient space between the cylindrical protrusions to allow one or more handles 302 of a container 300 to be pressed against the front edge 208 in between the cylindrical protrusions. The purpose of the stabilizer depression 126 is to provide a barrier whereby the container 300 is restrained from excessive side-to-side movement by butting against the stabilizer container end 130.

In some embodiments, the stabilizer 124 may be constructed of high-friction material. In other embodiments, the stabilizer depression 126 may be lined or coated with high-friction material to increase the frictional forces when a container handle 302 is pressed against the stabilizer container end 130. It should be apparent to those skilled in the art that a stabilizer 124 may be configured to attach to one or more handles 302 or other portions of the container 300 without having to fasten the stabilizer 124 to the front edge 208 of the vehicle seat. For example, a stabilizer 124 consisting of a flat rectangular block and a ring or bracket centrally attached to the stabilizer container end 130 may be fastened to the handles 302 of a container 300 in such a way that allows the stabilizer seat end 128 to press against the front edge 208 of the vehicle seat 200, while still being attached to the container 300. In some embodiments in which the stabilizer 124 is not attached to the front edge 208 of a vehicle seat 200, the stabilizer seat end 128 may be lined or coated with high-friction material so as to increase the friction between the stabilizer seat end 128 and the front edge 208 of the vehicle seat 200.

Figure 5:
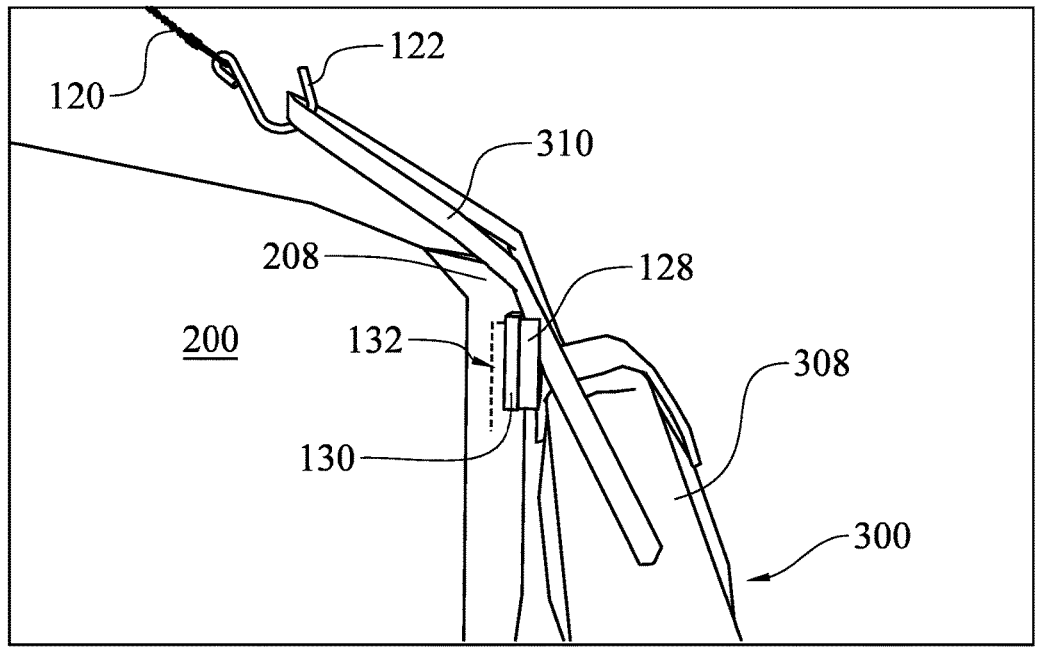
FIG. 5 is a close up view of an exemplary container engaging the front edge of the vehicle seat and a handle engaging a stabilizer, in accordance with an embodiment of the present invention.

As illustrated in FIG. 5, the stabilizer seat end 128 is secured on the front edge 208 of the vehicle seat 200 through a pair of pins 132 inserted into the front edge 208. The container 300 can butt up against the stabilizer container end 128, which in essence, serve as a supportive barrier for the container 300. Additionally, the stabilizer 124 may also include a stabilizer depression 126 through which the handle 302 slides through for aligning the container 300 along the front edge 208 of the vehicle seat 200. In one embodiment, the stabilizer depression 126 is a V-shaped or U-shaped groove designed to enable the handle 302 to slide through. In the embodiment for FIG. 5, a purse handle 310 is connected to a container fastener 122.

Figure 6:
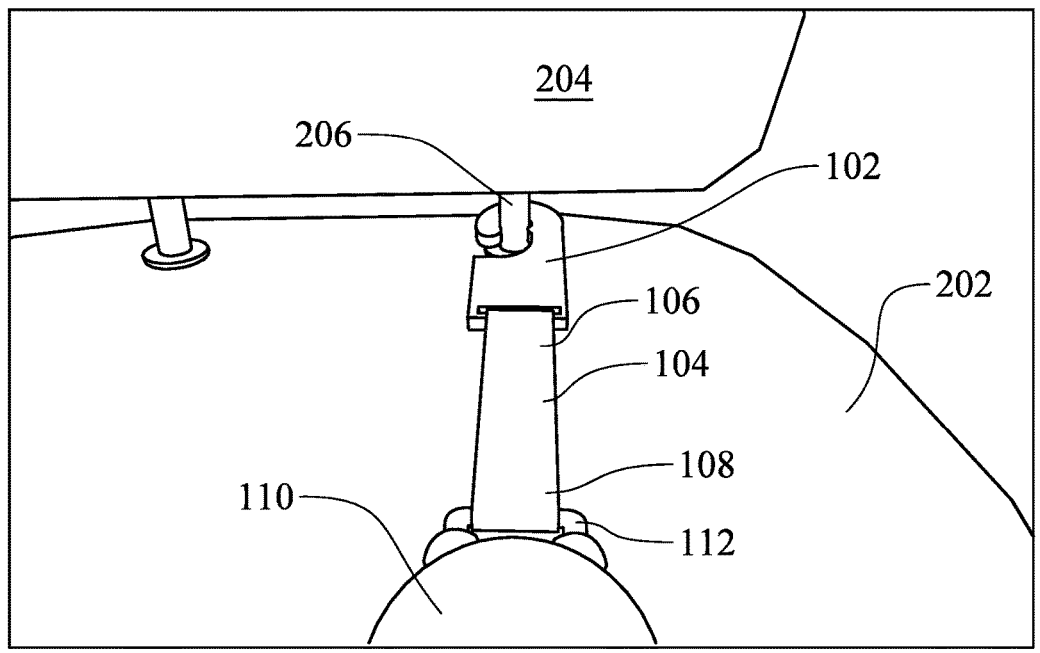
FIG. 6 is a close up view of an exemplary vehicle fastener engaging a headrest pole, in accordance with an embodiment of the present invention.

As illustrated in FIG. 6, the vehicle fastener 102 connects to the headrest pole 206. The strap upper end 106 attaches to the vehicle fastener 102. The strap lower end 108 attaches to the recoiling wheel 110 by passing through the wheel strap end 112. The wheel strap end 112 may include a U-shaped bracket configured to receive the strap lower end 108, whereby the free end of the strap lower end 108 loops around the U-shaped bracket and refastens to the strap lower end 108. It should be apparent to those skilled in the art that, in one embodiment, the vehicle fastener 102, strap 104, and recoiling wheel 110 may be constructed as one piece or a combination of two pieces such as vehicle fastener 102 and strap 104 or strap 104 and recoiling wheel 110. In some embodiments, the vehicle fastener 102, strap 104 and recoiling wheel 110 may be constructed of three or more pieces that, when assembled, have the same combined function of the vehicle fastener 102, strap 104, and recoiling wheel 110.

The recoiling wheel 110 utilizes a torsion spring that is biased to pull the container 300 in the first direction, upwards towards the recoiling wheel 110, against the front edge 208 of the vehicle seat 200. The biased force created by the recoiling wheel 110 pulls against the weight of the container 300. A gravitational force on the container 300 pulls against the biased force of the recoiling wheel 110 in a second direction. Thus, the biased force from the recoiling wheel 110 and the weight of the container 300 work simultaneously, and in opposite directions to create a state of equilibrium that helps stabilize the container 300 against the front edge 208 of vehicle seat 200 and the vehicle floor 210.

When the spring force pulls the container 300 against the front edge 208 of the vehicle seat 200, the surfaces of the container 300 press against the surface of the front edge 208, thereby, creating friction between the surfaces. Additionally, friction is created between the container 300 and the vehicle floor 210 when the container 300 is placed on the vehicle floor 210. Together, the spring force from the recoiling wheel 110, the frictional forces from the container 300/front edge 208 and container 300/vehicle floor 210 surfaces in contact with each other, and the weight of the container 300 work in conjunction to partially restrain the container 300 against the vehicle seat 200, as the container 300 remains in contact with the front edge 208 of the vehicle seat 200 and the vehicle floor 210.

Figures 7A, 7B:
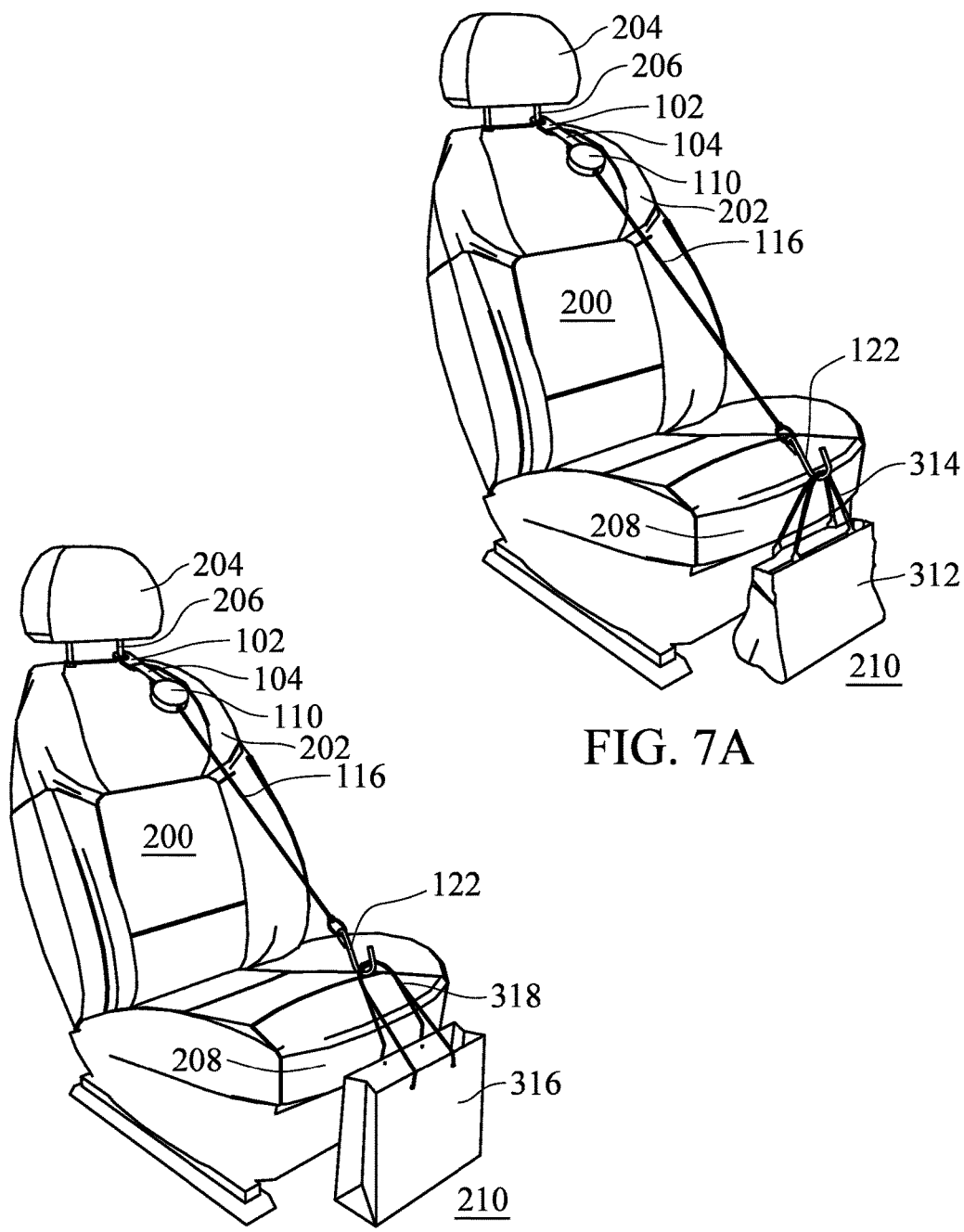
FIGS. 7A, 7B, 7C, 7D, 7E, and 7F are perspective views of an exemplary device, restraining a variety of containers at their handles, where
Figures 7C, 7D:
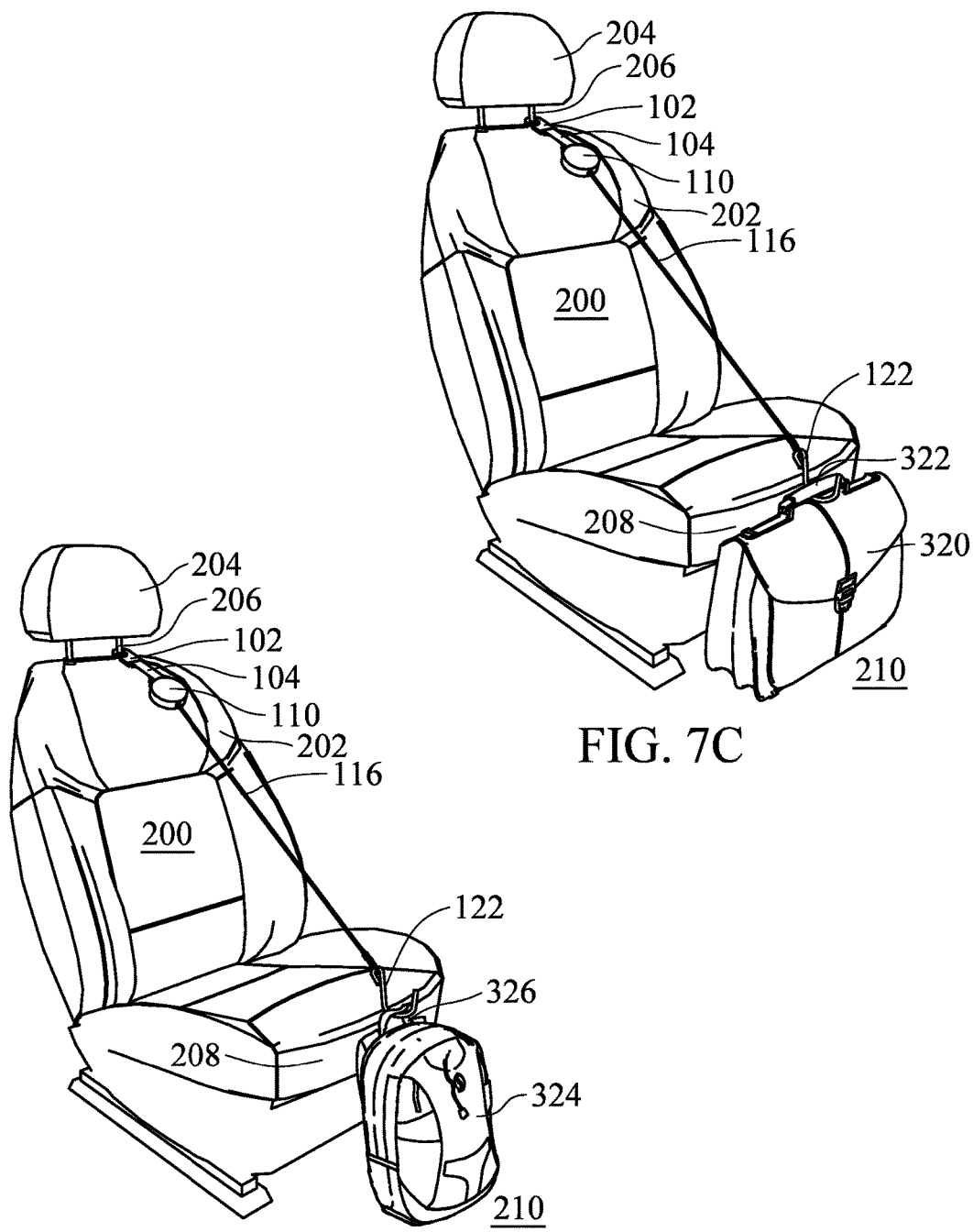
Figure 7E:
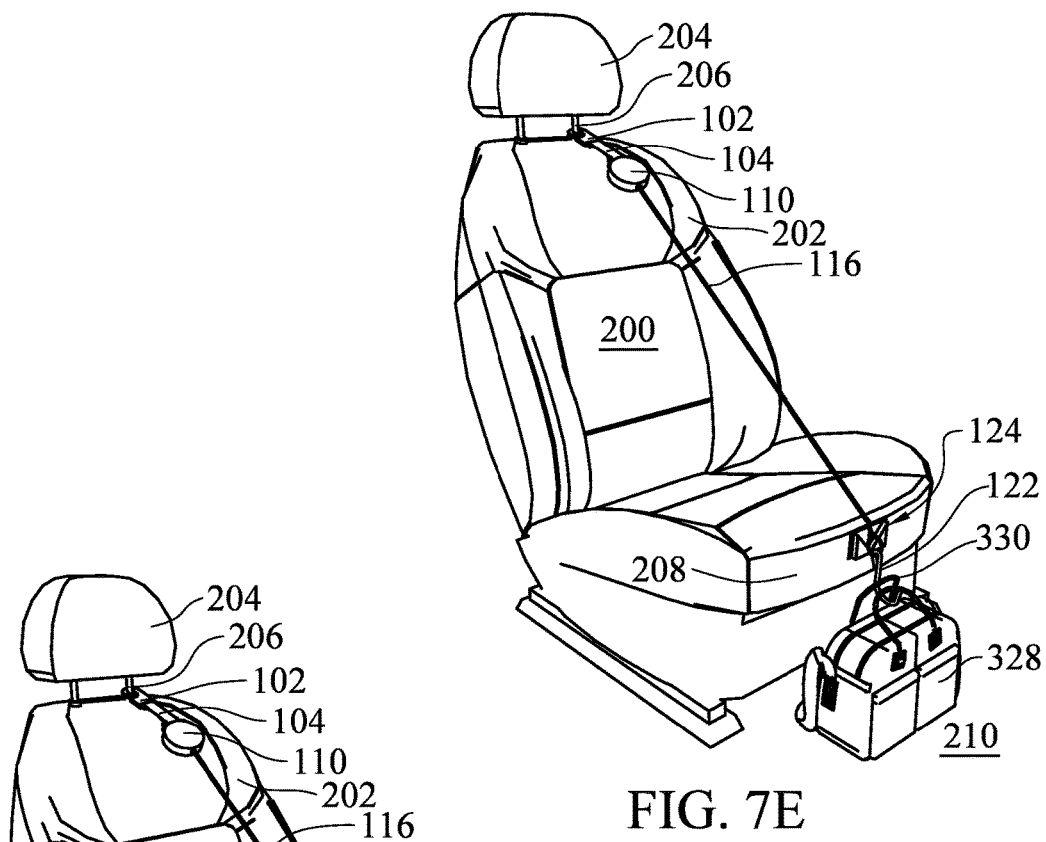
Figure 7F:
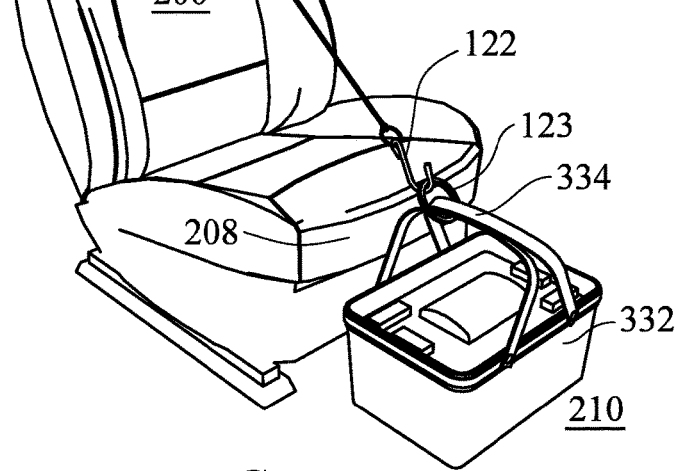

FIGS. 7A, 7B, 7C, 7D, 7E, and 7F are perspective views of an exemplary device 100 restraining a variety of containers 300 at handles 302. The device 100 may be used to restrain myriad types and sizes of containers 300 to restrict movement during normal vehicle operation. FIG. 7A shows an exemplary handbag 312 being restrained against the front edge 208 of the vehicle seat 200. An exemplary handbag handle 314 is hooked onto the container fastener 122. FIG. 7B shows an exemplary shopping bag 316 being restrained against the front edge 208 of the vehicle seat 200. An exemplary shopping bag handle 318 is hooked onto the container fastener 122. FIG. 7C shows an exemplary briefcase 320 being restrained against the front edge 208 of the vehicle seat 200. An exemplary suitcase handle 322 is hooked onto the container fastener 122. FIG. 7D shows an exemplary backpack 324 being restrained against the front edge 208 of the vehicle seat 200. An exemplary backpack handle 326 is hooked onto the container fastener 122. FIG. 7E shows an exemplary camera bag 328 being restrained against the front edge 208 of the vehicle seat 200 utilizing a stabilizer 124 having a generally V-shaped or U-shaped groove in communication with container fastener 122. An exemplary camera bag handle 330 is hooked onto the container fastener 122. FIG. 7F shows an exemplary basket 332 being restrained against the front edge 208 of the vehicle seat 200. The container fastener 122 is engaging an exemplary removable loop 123 that is attached to an exemplary basket handle 334. The removable loop 123 may be a ring, rope, or clamp. Although FIG. 7F does not show a break in the loop, other embodiments of the removable loop 123 may include hinges, a break or gap in the removable loop 123.

These illustrative examples of containers 300 demonstrate how any number or type of containers 300 such as the grocery bag 304, purse 308, handbag 312, shopping bag 316, suitcase 320, backpack 324, camera bag 328, and basket 332 may contain items that should remain upright and/or should not be shaken, jolted, jostled, or subjected to any other disruptive movement often experienced in an operating vehicle. An example of an item inside a container 300 that is better remaining upright during vehicle transport is, without limitation, a carton of milk in a grocery bag 304. An example of an item inside a container 300 that should not be jostled inside a moving vehicle is, without limitation, a fragile vase inside a shopping bag 316. In these cases, it is preferable to have the container 300 remain still and substantially upright during transportation in the vehicle. Furthermore, the time and energy spent securing the container 300 to the device 100 should be minimal, as too much time or effort to secure and release/retrieve the containers 300 can be cumbersome. While the effort to secure and release the container 300 may be minimally time-consuming, it is necessary when balanced against an unsafe condition in the vehicle because of loose items or spillage caused by vehicle movement.

Those skilled in the art, in light of the present teachings, will recognize that the device 100 requires minimal steps to attach the vehicle fastener 102 to the headrest pole 206, and easily-repeatable steps to attach the container fastener 122 to the handle 302 on the container 300. Thus, the device 100 does not require excessive or cumbersome manipulations to secure and remove the container 300 from its position adjacent to the vehicle seat 200. In one example, a vehicle operator simply enters the driver's side of a vehicle with a shopping bag 316 at hand; places the shopping bag 316 on the vehicle floor 210 in front of the passenger side vehicle seat 200; pulls the shopping bag handle 318 back to hook into the container fastener 122; and releases the shopping bag 316 under its own weight.

In practice the container 300 is placed on the vehicle floor 210 close to the front edge 208 of the vehicle seat 210, the handles 302 are pulled toward the device 100 and the hook (container fastener 122) is pulled toward the handles 302, the hook (container fastener 122) grasps the handles 302, and the sequence is completed when the hook (container fastener 122) is released and allowed to pull the handles 302 together through the spring force exerted on the cable 116 by the recoiling wheel 110. The vehicle operator may then drive without worrying about the contents of the container 300 spilling out. When not in use, the substantially planar dimensions of the device 100 and the flexible extension between the vehicle fastener 102 and the recoiling wheel 110 allow the device 100 to quickly and easily swing around the headrest pole 206 to the back side of the vehicle seat 200 for discrete storage.

Figure 8:
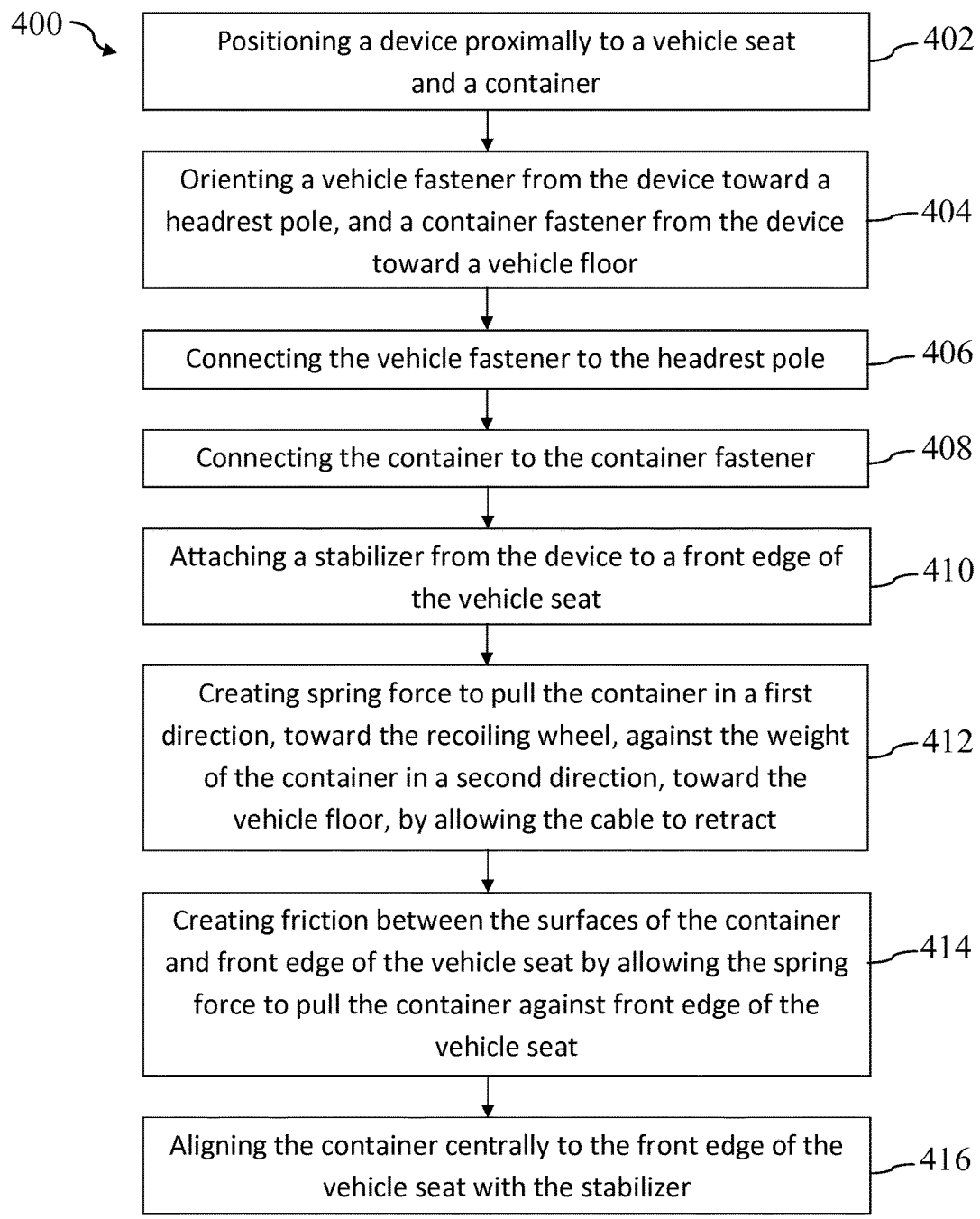
FIG. 8 is a flowchart diagram of an exemplary method for restraining a container in a vehicle, in accordance with an embodiment of the present invention.

FIG. 8 illustrates a flowchart diagram of an exemplary method 400 for restraining a container 300 in a vehicle. The method 400 is efficacious for restraining a container 300 against a vehicle seat 200 through the use of spring, frictional, and gravitational forces. In one embodiment, the device 100 restrains the container 300 against the vehicle seat 200 during vehicle operation, preventing excessive movement by the container 300. The method 400 may include an initial Step 402 of positioning a device 100 proximally to a vehicle seat 200 and a container 300. The device 100 is lightweight and portable, and thus may be interchanged between different vehicle seats 200. The method 400 may further comprise a Step 404 of orienting a vehicle fastener 102 from the device 100 towards a headrest pole 206, and a container fastener 122 from the device 100 towards a vehicle floor 210.

A Step 406 includes connecting the vehicle fastener 102 to the headrest pole 206. The vehicle fastener 102 is configured to latch onto the headrest pole 206 of the vehicle seat 200, which may be adjustable to expose more of the headrest pole 206 to the vehicle fastener 102. The vehicle fastener 102 may include, without limitation, a hook, a carabiner, a clasp, a loop, a ring, or a magnet. In some embodiments, a Step 408 comprises connecting the container 300 to the container fastener 122. The container fastener 122 may include, without limitation, a hook, a carabiner, a clasp, a loop, a ring, or a magnet. The container fastener 122 is configured to grasp, clip, pierce, or wrap around the container 300, and specifically a handle 302, apertures, loops, or rings on the container 300.

A Step 410 may include attaching a stabilizer 124 from the device 100 to a front edge 208 of the vehicle seat 200. The device 100 may include a stabilizer 124 to help stabilize the container 300 against the front edge 208 of the vehicle seat 200. The stabilizer 124 may include a substantially rectangular block disposed to fasten securely to the front edge 208 of the vehicle seat 200. It is significant to note that in the method 400, there is an option to either utilize the stabilizer 124, or not utilize the stabilizer 124. The decision to use (or not use) the stabilizer 124 may be based on a personal preference and/or the practicality of using the stabilizer 124 in certain situations such as whether portions of the container 300 may be pressed against the inside of the stabilizer 124.

In some embodiments, a Step 412 may include allowing spring force to pull the container 300 in a first direction toward a recoiling wheel against the weight of the container 300 which is pulling in a second direction toward the vehicle floor 210, by allowing the cable to retract. In some embodiments, the strap lower end 108 may attach to a recoiling wheel 110. The recoiling wheel 110 utilizes a torsion spring that is biased to pull (refract) in the first direction, upwards towards the recoiling wheel 110, when the cable 116 is extended from the recoiling wheel 110. When the cable 116 is allowed to retract, the spring force pulls the container 300 against the front edge 208 of the vehicle seat 200. A state of equilibrium is reached when the spring and gravitational forces are balanced, resulting in the container 300 and the vehicle seat 200 not moving relative to each other.

A Step 414 comprises allowing friction between the surfaces of the container 300 and the front edge 208 of the vehicle seat 200, and between the surfaces of the container 300 and the vehicle floor 210 by allowing the spring force to pull the container 300 against the front edge 208 of the vehicle seat 200. When the spring force is allowed to pull the container 300 in the first direction toward the recoiling wheel 110 and the container 300 is pulled against the vehicle seat 200, surfaces of the container 300 are pressed against the front edge 208 of the vehicle seat 200. As a result frictional forces are created between the container 300 and front edge 208 surfaces. Additionally, the container 300 remains in contact the vehicle floor 210, which also creates friction between the surfaces of the bottom of the container 300 and the vehicle floor 210. The frictional forces between the container 300 and front edge 208 surfaces that are pressed against each other resist the relative motion of the container 300 and front edge 208 surfaces sliding against each other. The frictional forces between the container 300 and the vehicle floor 210 resist the relative motion of the container 300 across the surface of the vehicle floor 210. The frictional forces that are exerted between the aforementioned surfaces serve to partially restrain the container 300 while the vehicle is stationary (at rest), accelerating, decelerating, or turning. It should be apparent to those skilled in the art that, if a stabilizer 124 is used, friction may be created between the container 300 and the stabilizer container end 130, thereby also providing resistance to relative motion.

A final Step 416 includes aligning the container 300 centrally to the front edge 208 of the vehicle seat 200 with the stabilizer 124. The stabilizer 124 has a stabilizer depression 126 through which the handle 302 slides through for aligning the container 300 along the front edge 208 of the vehicle seat 200. The stabilizer 124 provides a restrictive barrier to the side-to-side movement of the container handles 302. In some embodiments, the stabilizer 124 may be constructed of high-friction material. In other embodiments, the stabilizer 124 may be lined or coated with high-friction materials that can increase the friction between the container handles 302 and the stabilizer container end 130 surfaces. Thus, the combinative effect of the spring force generated from the recoiling wheel 110 when the cable 116 is extended; the friction created between the container 300 and the front edge 208 surfaces when pressed against each other; the friction between the container 300 and vehicle floor 210 surfaces when the container 300 is placed on the vehicle floor 210; the weight of the container 300 and contents on the vehicle floor 210; and the laterally-restrictive barrier formed by the stabilizer 124, create a synergy for restraining the container 300 in an operating vehicle.

Figure 9:
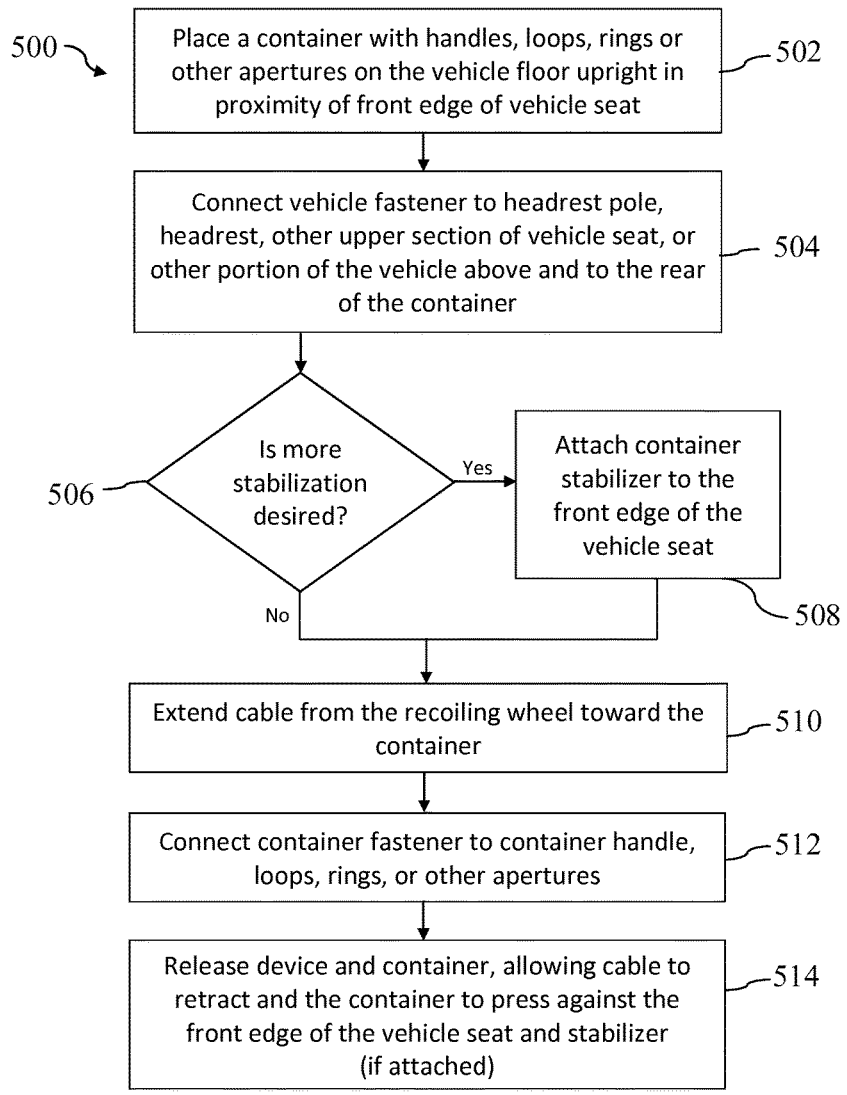
FIG. 9 is a flowchart diagram of another exemplary method for restraining a container in a vehicle, in accordance with an embodiment of the present invention.

FIG. 9 illustrates a flowchart diagram of another exemplary method 500 for restraining a container 300 in a vehicle. The method 500 is efficacious for restraining a container 300 against a vehicle seat 200 through a combination of contact and non-contact forces including spring, frictional, and gravitational forces. In one embodiment, the device 100 restrains the container 300 against the vehicle seat 200 during vehicle operation, preventing excessive movement by the container 300. The method 500 may include an initial Step 502 of placing a container 300 with handles 302, strap, loop, ring or other aperture on the vehicle floor 210 upright in the close proximity of a front edge 208 of a vehicle seat 200. The purpose of Step 502 is to prepare the container 300 and the handles 302, strap, loop, ring or other aperture for Step 512. The container 300 is generally positioned in the location of the vehicle floor 210 where the container 300 is intended to be restrained during vehicle operation.

A Step 504 includes connecting a vehicle fastener 102 to a headrest 204, headrest pole 206, or upper section 202 of a vehicle seat 200. The vehicle fastener 102 may include, without limitation, a hook, a carabiner, a clasp, a loop, a ring, a clamp, a magnet, and other fastening mechanisms. In one embodiment, the vehicle fastener 102 is configured to latch, grasp, clip, pierce or wrap around the headrest pole 206 of the vehicle seat 200, which may be adjustable to expose more of the headrest pole 206 to the vehicle fastener 102. In another embodiment, the vehicle fastener 102 may be connected to any other portion of the vehicle that is located above and to the rear of the front edge 208 of the vehicle seat 200. For example, the vehicle fastener 102 may be attached to the interior roof of the vehicle when the vehicle seat 200 does not have a separate headrest 204 or does not use headrest poles 206. In the example, the vehicle fastener 102 connects to a separate mechanism attached to the interior roof of the vehicle generally located above and rear of the front edge 208 of the vehicle seat 200. The device 100 must be able to press the container 300 against the front edge 208 of the vehicle seat 200 or allow the cable 116 and/or container fastener 122 to press against the front edge 208 of the vehicle seat 200.

Although Steps 502 and 504 of the method 500 described herein appear to occur in a specific order, it should be apparent to those skilled in the art that Step 502 or 504 of the method 400 may be the initial step followed by Step 504 or 502 respectively. It should also be apparent to those skilled in the art that once Step 504 has been completed, Step 504 may not have to be completed for any subsequent uses of the device 100 if the device 100 was not removed after its previous use. In this situation, the device 100 is already connected, thereby allowing the flow of the method 500 to go from Step 502 to Step 506.

A Step 506 is a decision point in which an election is made to use or not use a stabilizer 124 based on a decision maker's desire for additional stabilization. The decision may be based on the size and/or weight of the container 300 and contents of the container 300; the height of the vehicle seat 200 from the vehicle floor 210; the length of the handles 302, loop, or strap; and/or the personal preference of the decision maker. However, the decision maker may not desire to use the stabilizer 124 in certain situations. If additional stabilization is desired by the decision maker, Step 508 follows. If additional stabilization is not desired by the decision maker, Step 510 follows.

A Step 508 includes attaching a stabilizer 124 to a front edge 208 of a vehicle seat 200. The device 100 may include a stabilizer 124 to help stabilize the container 300 against the vehicle seat 200. In one embodiment, the stabilizer 124 may include a substantially rectangular block disposed to fasten securely to the front edge 208 of the vehicle seat 200. In other embodiments, the stabilizer 124 may be constructed of high-friction material. In another embodiment, the stabilizer 124 may be lined or coated with high-friction material such as rubber to increase the friction between the surfaces of the stabilizer 124 and the container 300. It should be apparent to those in skilled in the art that the stabilizer 124 may be attached to the container 300, instead of the attaching the stabilizer 124 to the front edge 208 of the vehicle seat 210.

A Step 510 includes extending a cable 116 from a recoiling wheel 110 toward a container 300. When the cable 116 is pulled from the recoiling wheel 110, the cable 116 is unwound from the recoiling wheel 110, the torsion spring inside the recoiling wheel 110 is compressed, and a spring force is exerted upon the cable 116. As a result, the spring force exerted on the cable 116 is biased to pull the cable container end 120 in a first direction, toward the recoiling wheel 110. The cable 116 must be maintained extended while performing Step 512.

A Step 512 includes connecting a container fastener 122 to a handle 302, sling, loop, ring or other aperture in the container 300. The container fastener 122 may include, without limitation, a hook, a carabiner, a clasp, a loop, a ring, a clamp, a magnet, and/or other fastening mechanisms. In one embodiment, the container fastener 122 is configured to grab one or more handles 302 of a container 300. In another embodiment, the container fastener 122 is configured to grab one or more loops, rings, or other apertures in the container 300. In yet another embodiment, the container fastener 122 is configured to latch, grasp, clip, pierce or wrap around the container 300. When the container fastener 122 is difficult to connect to the handles 302, slings, loops, rings or apertures of a container 300, the container fastener 122 may connect to a separate ring or loop that is used to keep handles 302, slings, loops, rings or other apertures together.

A Step 514 includes releasing the device 100 and container 300, allowing the container 300 to press against the front edge 208 of the vehicle seat 200. While the container fastener 122 is connected to the handles 302, sling, loop, ring or other aperture of a container 300, the applied force exerted to maintain the cable 116 extended toward the container 300 may be released. The spring force generated from the torsion spring inside the recoiling wheel 110 biases the exposed cable 116 to retract into the recoiling wheel 110. The handles 302, sling, loop, ring, or other aperture are pulled in a first direction, toward the recoiling wheel 110. As a result, the handles 302, sling, loop, ring or other aperture are pulled against the front edge 208 of the vehicle seat 200, causing the handles 302, sling, loop, ring or other aperture to press bend and/or wrap over the front edge 208 of the vehicle seat 200. The pulling in the first direction, toward the recoiling wheel 110 is countered with the gravitational force (weight) of the container 300 and contents, and the frictional forces created by the container 302 surface pressing against the front edge 208 of the vehicle seat 200. If the a stabilizer 124 was attached to the front edge 208 of a vehicle seat 200 to provide additional stabilization, the device 100 and container 300 are aligned with the stabilizer 124 prior to releasing the device 100 and container 300. The stabilizer 126 has a depression 126 through which the handle 302 slides through for aligning the container 300 along the front edge 208 of the vehicle seat 200.

The combinative effect of the spring force generated by a torsion spring inside a recoiling wheel 110; the frictional forces created by a container 300 pressing against a front edge 208 of a vehicle seat 200 and against the vehicle floor 210; and the gravitational force of the container 300 and contents limits the back-and-forth, side-to-side, and up-and-down movement of the container 300 while maintaining the container 300 upright during vehicle operations (i.e., accelerating, decelerating, and turning). When used, a stabilizer 124 provides an additional barrier to further limit lateral movement of a container 300 across the front edge 208 of the vehicle seat 200.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A device for restraining a container in a vehicle through the use of the combinative effect of spring, frictional, and gravitational forces, the device comprising:
a vehicle fastener configured to anchor the device;
an adjustable strap comprising a strap upper end and a strap lower end, the strap upper end disposed to join with the vehicle fastener, the strap configured to stretch laterally, vertically, and diagonally;
a recoiling wheel comprising a wheel strap end and a wheel cable end, the wheel strap end disposed to join with the strap lower end, the recoiling wheel configured to create a biased force in a first direction;
a cable comprising a cable wheel end and a cable container end, the cable wheel end disposed to join with the wheel cable end, wherein the recoiling wheel biases the cable to retract in a first direction;
a container fastener disposed to join with the cable container end, the container fastener configured to form a point of attachment; and
a stabilizer configured to provide a surface for support and alignment; wherein the first direction presses the container against a front edge of a vehicle seat; wherein the stabilizer positions on the front edge of the vehicle seat; and wherein the stabilizer comprises a depression configured to receive a handle from the container such that the stabilizer depression aligns the container with the front edge of the vehicle seat and restricts side-to-side movement of the container.

2. The device of claim 1, wherein the device is disposed to position on a vehicle seat.

3. The device of claim 1, wherein the vehicle fastener is a hook or a carabiner.

4. The device of claim 1, wherein the vehicle fastener attaches to an adjustable headrest pole.

5. The device of claim 1, wherein the strap is stretchable.

6. The device of claim 1, wherein the strap is length adjustable.

7. The device of claim 1, wherein the recoiling wheel comprises a torsion spring.

8. The device of claim 1, wherein the first direction is upwards, towards the recoiling wheel.

9. The device of claim 1, wherein the cable winds around a spool inside the recoiling wheel.

10. The device of claim 1, wherein the cable is fabricated from a synthetic cord or a metal chain.

11. The device of claim 1, wherein the container fastener is a hook or carabiner.

12. The device of claim 1, wherein the container fastener forms a point of attachment with a container through a removable loop.

13. The device of claim 12, wherein the weight of the container and contents exerts a force in a second direction.

14. The device of claim 1, wherein the stabilizer is a substantially rectangular block with a generally V-shaped or U-shaped grove.

15. A method for restraining a container in a vehicle through the use of the combinative effect of spring, frictional, and gravitational forces, the method comprising:
positioning a device proximally to a vehicle seat and a container;
orienting a vehicle fastener from the device towards a headrest pole, and a container fastener from the device towards a vehicle floor;
connecting the vehicle fastener to the headrest pole;
connecting the container to the container fastener;
enabling formation of spring force against the container by pulling the container in a first direction with a recoiling wheel, the first direction working against a second direction from the weight of the container;

enabling at least partial formation of frictional forces against the container by pulling the container against the front edge of the vehicle seat enabling at least partial formation of frictional forces against the container through a gravitational force that presses the container against the vehicle floor;

aligning the container centrally to the front edge of the vehicle seat with the spring force and the frictional force; attaching a stabilizer to a front edge of the vehicle seat to limit horizontal, vertical and diagonal movement of the container and provide increased friction between the container and front edge of the vehicle seat; creating spring force against the container by pulling the container in a first direction with a recoiling wheel, the first direction working against a second direction from the weight of the container; creating friction against the container by pressing the container against the front edge of the vehicle seat; and aligning the container centrally to the front edge of the vehicle seat with the stabilizer.

16. A method for restraining a container in a vehicle through the use of the combinative effect of spring, frictional, and gravitational forces, the method comprising:

placing a container with handles, loops, rings or other apertures on a vehicle floor in an upright position under its own weight and in close proximity to a front edge of a vehicle seat;

connecting a vehicle fastener to a headrest pole, a headrest, other area of the upper section of a vehicle seat, or other portion of a vehicle above and to the rear of the front edge of the vehicle seat;

attaching a stabilizer to the front edge of the vehicle seat;

extending a cable from a recoiling wheel toward the container, generating spring force in a first direction, toward the recoiling wheel;

connecting a container fastener to the container; and releasing the device and container to allow the cable to retract in the first direction, and the container to centrally align to and press against the front edge of the vehicle seat and stabilizer.

\* \* \* \* \*